United States Patent [19]

Brophy

[11] 4,441,470

[45] Apr. 10, 1984

[54] DEVICE FOR USE WITH THE INTAKE MANIFOLD OF AN INTERNAL COMBUSTION ENGINE

[75] Inventor: John Brophy, Yonkers, N.Y.

[73] Assignee: Cos Cob Research Associates, Cos Cob, Conn.

[21] Appl. No.: 344,317

[22] Filed: Feb. 1, 1982

[51] Int. Cl.³ .............................................. F02B 31/00
[52] U.S. Cl. ................................ 123/306; 123/188 M; 123/52 M; 123/537
[58] Field of Search .................. 123/306, 188 M, 308, 123/52 M, 590, 432

[56] References Cited

U.S. PATENT DOCUMENTS

| 3,145,696 | 8/1964 | Baster | 123/188 M |
| 3,422,805 | 1/1969 | Dzianott | 123/188 M |
| 4,095,578 | 6/1978 | Allara et al. | 123/188 M |
| 4,228,772 | 10/1980 | Bakonyi | 123/188 M |
| 4,308,830 | 1/1982 | Yamada et al. | 123/308 |
| 4,336,777 | 6/1982 | Yanagihara et al. | 123/188 M |
| 4,359,026 | 11/1982 | Holthausen et al. | 123/188 M |

FOREIGN PATENT DOCUMENTS 53-1712  1/1978  Japan ................................... 123/306

Primary Examiner—Craig R. Feinberg
Assistant Examiner—David Okonsky
Attorney, Agent, or Firm—Darby & Darby

[57] ABSTRACT

A small tube is placed in each of the branches of the intake manifold of an internal combustion engine. The tube is aligned with respect to the intake port and the intake valve so as to direct a portion of the fuel air mixture flowing through the tube away from the intake valve. When properly aligned, the invention provides more complete combustion within the combustion chambers of the engine resulting in greater power and efficiency and the emission of fewer pollutants.

7 Claims, 3 Drawing Figures

DEVICE FOR USE WITH THE INTAKE MANIFOLD OF AN INTERNAL COMBUSTION ENGINE

This invention relates to a device for use with internal combustion engines. More particularly, this invention relates to a device which, when inserted in the intake manifold of an internal combustion engine, enhances the power, fuel economy, efficiency, and pollution rating of the engine.

BACKGROUND

It is known that the power and efficiency of an internal combustion engine can be improved by increasing the turbulence of the air fuel mixture in the combustion chamber. Many different arrangements have been proposed for this purpose. For example, spiral inlet ducts have been used to impart a swirling motion to the incoming mixture. (See, for example, U.S. Pat. Nos. 4,008,458 and 3,868,940). Shekleton U.S. Pat. No. 4,182,280 shows an arrangement of swirl inducing vanes in each of the intake ports of an internal combustion engine immediately adjacent the intake valve. Matsumota U.S. Pat. No. 4,186,706 employs a "sub-inlet system" which is arranged to introduce the fuel-air mixture into the combustion chamber in a swirling pattern at high velocity to improve flame propagation and combustion. Other swirl inducing arrangements are shown in Vogel U.S. Pat. No. 2,920,613 and List U.S. Pat. No. 3,874,357. These existing constructions are relatively costly and would be prohibitively expensive to add to existing engines. Moreover, in general, they do not provide the maximum available power, fuel economy and efficiency for the particular engine involved.

OBJECTS OF THE INVENTION

The principal object of the invention is to increase the power, fuel economy and efficiency of an internal combustion engine.

Another object is to provide more complete combustion within the combustion chambers of an internal combustion engine, thereby improving performance and decreasing the level of emissions from the engine.

A more specific object of the invention is to provide a device capable of achieving the above objectives which can be easily and inexpensively installed on existing engines.

SUMMARY OF THE INVENTION

Briefly, in accordance with the invention, a small tube is specially aligned in each branch of the intake manifold of an internal combustion engine in such a way that it directs a portion of the incoming air (alone or mixed with fuel) against the intake port of its associated cylinder at a point remote from the intake valve.

THE DRAWINGS

DETAILED DESCRIPTION

The invention has been tested experimentally in a number of different automobile engines with substantially improved results in all cases. For the sake of example only, in the following detailed description of the invention, the invention is illustrated and described as applied to the engine of a 1980 Toyota Corolla. This engine is a four cylinder, 1.8 liter hemihead engine of well-known design.

Figure 1:
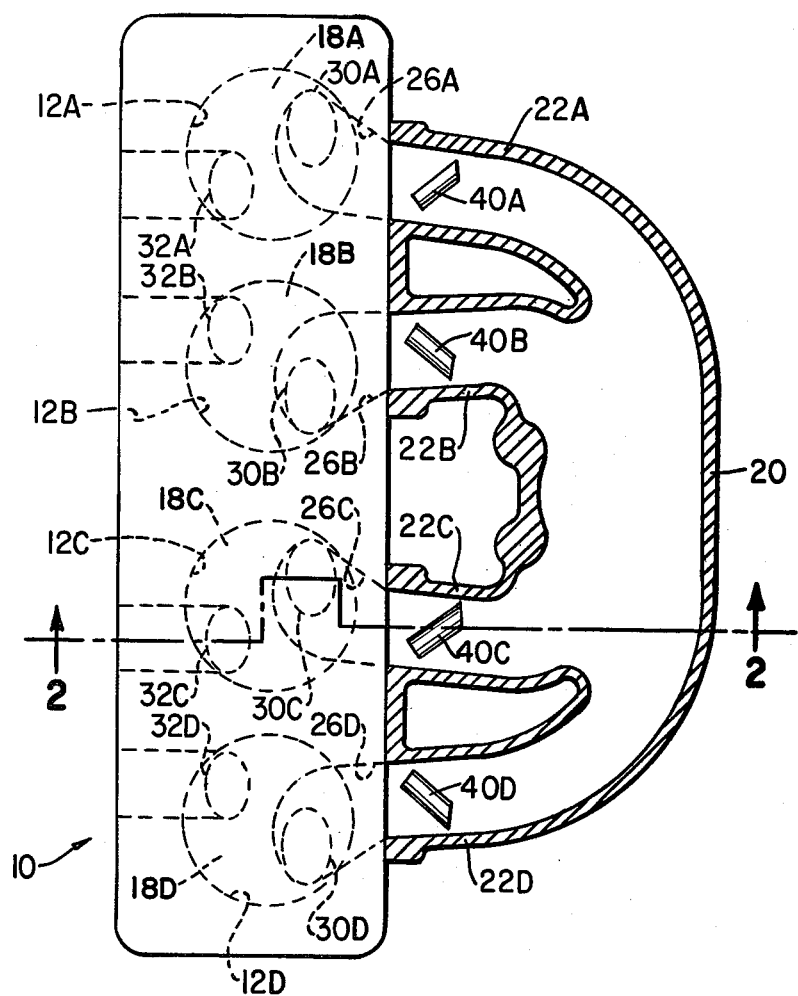
FIG. 1 is a plan view, partially in cross-section, of a preferred embodiment of an internal combustion engine according to the invention.
Figure 2:
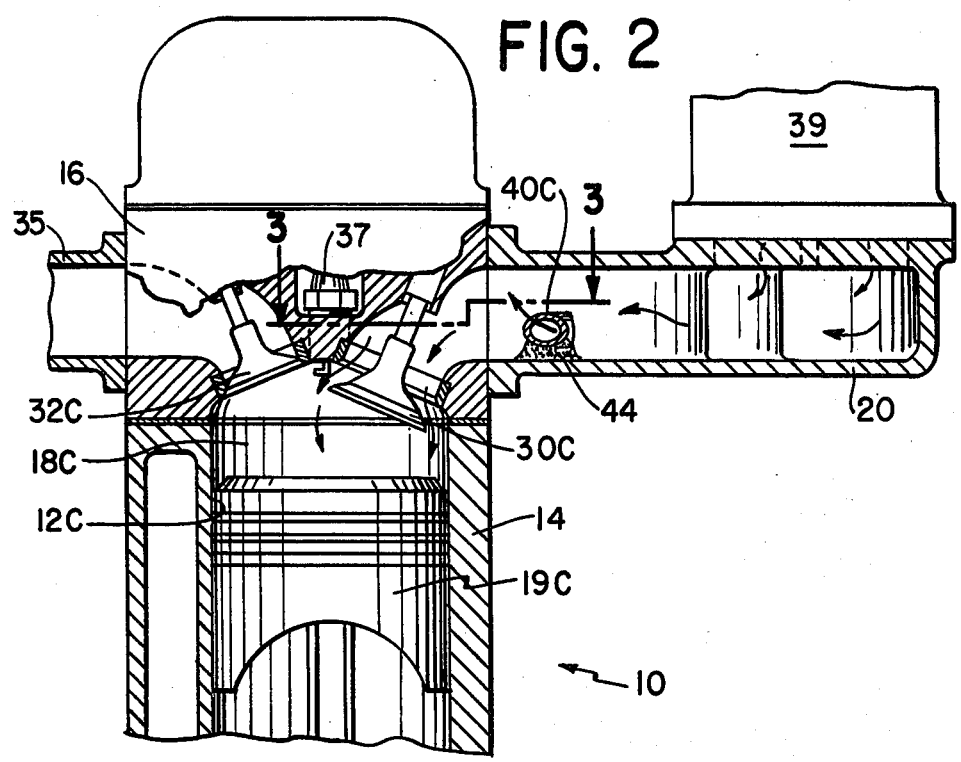
FIG. 2 is a cross-sectional side view along the line 2—2 of FIG. 1.

Referring to the drawings, a conventional internal combustion engine includes an engine body 10 containing four cylinders designated 12A, 12B, 12C and 12D within a cylinder block 14. A cylinder head 16 is secured to the block 14 and defines combustion chambers 18A, B, C and D with the respective cylinders 12A, B, C and D. One of the four pistons is shown in FIG. 2 at 19C.

An intake manifold 20 includes four manifold branches 22A, B, C and D cooperating with respective intake ports 26A, B, C and D within the cylinder head 16. The intake valves are shown at 30A, B, C and D and the exhaust valves are shown at 32A, B, C and D. An exhaust manifold 35 is connected to exhaust ports 36A, B, C and D and a sparkplug 37 is arranged in each of the combustion chambers 18A, B, C and D. The mechanisms for operating the intake and exhaust valves are not shown for the sake of simplicity. Likewise, the carburetor 39 which is mounted on the intake manifold 20 is shown only diagrammatically.

Figure 3:
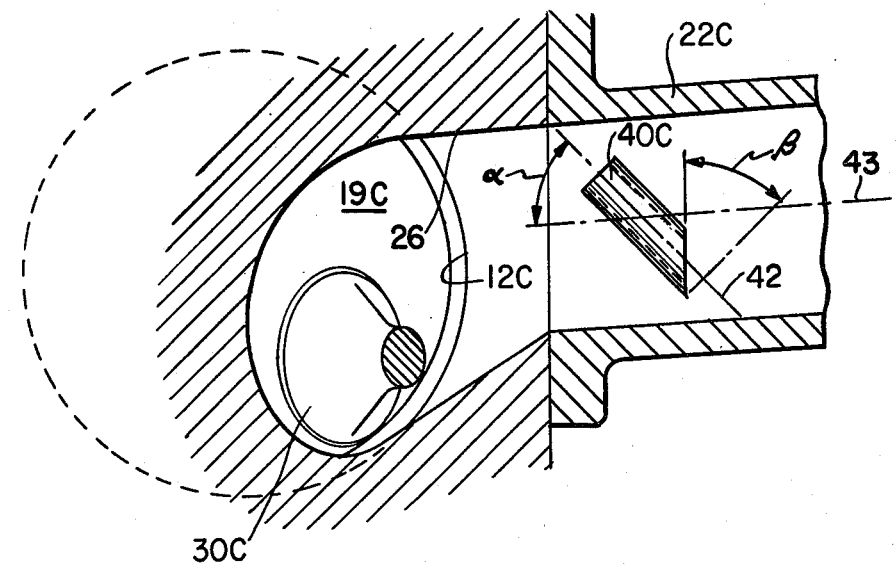
FIG. 3 is a top view, partially showing the intake manifold branch 22C and its respective valve port entrance.

In accordance with a preferred embodiment of the invention, small tubes 40 A, B, C and D are placed in the respective intake manifold branches 22A, B, C and D and aligned as shown so that a small part of the incoming fuel-air mixture is redirected through the tube 40 against the curved surface of the associated intake port 26. The construction and arrangement of the tube 40A is shown in detail in FIG. 3, the same principles of construction and operation being applicable to the tubes 40B, C and D.

The axis of the tube shown at 42 is placed at an angle with respect to the axis 43 of the manifold branch 22C and the inlet end of the tube is cut to form an angle $\beta$ which is substantially less than 90°. These angles are believed to be meaningful in the practice of the invention.

The angle $\alpha$ is selected so that the air-fuel flow through the tube 40 strikes the wall of intake port 26 at a point as far removed from the intake valve 30 as possible. This has been found to be an important feature and it is believed to enhance the turbulence within the combustion chamber due to the increased length of the flow path.

The angle $\beta$ on the inlet side is preferably in the range of 35° to 45° so as to increase the amount of the fuel air mixture that will flow through the tube 20. The tube 40 is advantageously cut "square" (i.e. $\beta = 90°$) on its outlet side.

The diameter of the tube has a bearing on the successful operation of the invention; however, the extent to which the diameter may be critical is not fully known and in the particular engine described, (the branches 22 having an inner diameter of 1¼ inches), successful results have been obtained with commercial copper tubing having an outer diameter of ⅜ inch. The inner diameter of such tubing is about 5/16 inch (i.e. about 20% of the diameter of branch 22). This size worked well also with manifold diameters as large as two inches. The material of the tubing is not critical, although, of course, it must be able to withstand the conditions encountered within the manifold. Where the size of the intake ports permits, the tubes (in some cases) can be mounted directly in the ports instead of in the manifold branches.

Although tests have been conducted, it is not possible to determine with certainty at this time all of the optimum parameters of the invention. A tube length at least approximately 60% of the manifold branch diameter provides optimum results. In the case of the Toyota engine described, this corresponded to a tube length of about ¾ inches within a manifold branch of about 1¼ inch diameter. Also, the means by which the tube 40 is secured within the manifold branch 22 is not critical. In the embodiment described, the tube was held in place by an epoxy resin 44 applied after the manifold branch 22 and tube 40 had been cleaned.

Tests on the 1980 Toyota Corolla outfitted with the invention as described above indicate that performance of the automobile was substantially enhanced both in terms of power and gasoline mileage. Moreover, the emissions were lowered substantially.

Although some experimental work remains to be done on the invention in order to define its optimum parameters, it has been established that improved results are achieved when the fuel-air flow through the tube 40 is directed against a curved intake port at a point as far removed as possible from the inlet valve. In the case of a straight-in port, it is believed that the optimum results will be achieved if the tube is aligned or "aimed" both horizontally and vertically within the manifold. In that case, it may be necessary to suspend the tube on a suitable mounting device within the manifold.

Tests on a fuel-injected engine (Toyota Supra) where the fuel is injected directly into the intake manifold have shown that the tubes 40 are advantageously positioned at the tops of the intake manifolds and that they should be located "up-stream" of the point of fuel injection. In such a case, of course, only air flows through the tubes.

It is also contemplated that the invention may be incorporated into the gasket (manifold to head) in such a way that the invention can be installed within an engine by merely replacing the gaskets. A construction suitable for this purpose may be made of plastic and include fins on which the suitably shaped and aligned tube 40 is mounted. Other comparable constructions may also be used.

As mentioned above, the reasons for the improved performance when using the invention are not fully understood although it is believed that, in part at least, enhanced turbulence leads to more complete combustion which in turn provides greater torque, higher efficiency, and fewer pollutants. Although the principles of the invention are believed applicable to all internal combustion engines (including diesel engines), the specific application of the invention will vary depending upon the construction of the engine and manifold, and possibly other factors as well. For example, the type of carburetion may affect the optimal conditions in which the invention is practiced. As mentioned above, for fuel-injected engines, different criteria for the tubes may apply. Although only round tubes 40 have been used in practice, it is believed that the shape of the tubing is not a critical factor and the term "tube" as used herein is not to be construed as defining any particular cross-sectional shape. It is also believed that the benefits of the invention will be achieved even if the tube is not fully closed.

What is claimed is:

1. An internal combustion engine having a plurality of cylinders and an intake manifold including manifold branches for passing combustion air to each of the cylinders through an associated intake port and associated intake valve, wherein said associated intake port and a respective one of said manifold branches forms a passageway the improvement comprising a tube positioned diagonally in each passageway for the combustion air to the associated intake valve, each said tube being spaced from its associated intake valve, each said tube having a diameter substantially less than that of each manifold branch in which such tube is located and being angularly disposed so as to direct a portion of the combustion air flowing in each of the manifold branches through such tube away from the intake valve.

2. The improvement according to claim 1, wherein an inlet side of said tube is cut at an angle ($\beta$) between about 35° and 45°.

3. The improvement according to claims 1 or 2, wherein each tube has a length of about 60% of the diameter of its associated manifold branch.

4. The improvement according to claim 1 in which each of said tubes is positioned in each of said manifold branches.

5. The improvement according to claim 4, wherein an inlet side of said tube is cut at an angle ($\beta$) between about 35° and 45°, and an outlet side is cut at an angle of 90°.

6. The improvement according to claim 5 wherein each tube has a length of about 60% of the diameter of its associated manifold branch.

7. The improvement according to any of claims 4, 5 or 6, wherein each tube has an inner diameter between about 15-20% of that of the inner diameter of its associated manifold branch.

* * * * *